US008290241B2

(12) United States Patent
Ono et al.

(10) Patent No.: US 8,290,241 B2
(45) Date of Patent: Oct. 16, 2012

(54) ANALYZING APPARATUS, PROGRAM, DEFECT INSPECTION APPARATUS, DEFECT REVIEW APPARATUS, ANALYSIS SYSTEM, AND ANALYSIS METHOD

(75) Inventors: Makoto Ono, Yokohama (JP); Junko Konishi, Yokohama (JP); Tomohiro Funakoshi, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 1063 days.

(21) Appl. No.: 12/039,255

(22) Filed: Feb. 28, 2008

(65) Prior Publication Data

US 2008/0226153 A1 Sep. 18, 2008

(30) Foreign Application Priority Data

Mar. 16, 2007 (JP) ................................. 2007-067849

(51) Int. Cl.
*G06K 9/00* (2006.01)
(52) U.S. Cl. ...................................................... 382/149
(58) Field of Classification Search .................. 382/141, 382/145, 147, 149
See application file for complete search history.

(56) References Cited

U.S. PATENT DOCUMENTS

| 5,801,965 | A | * | 9/1998 | Takagi et al. | ................... | 702/35 |
| 6,177,287 | B1 | * | 1/2001 | Steffan et al. | ................... | 438/14 |
| 6,539,106 | B1 | * | 3/2003 | Gallarda et al. | ............... | 382/149 |
| 6,959,251 | B2 | * | 10/2005 | Coldren et al. | .................. | 702/83 |
| 2002/0002415 | A1 | * | 1/2002 | Mugibayashi et al. | ........ | 700/110 |
| 2003/0058444 | A1 | * | 3/2003 | Nara et al. | ..................... | 356/394 |

FOREIGN PATENT DOCUMENTS

JP 2005-017159 1/2005

* cited by examiner

*Primary Examiner* — Tarifur Chowdhury
*Assistant Examiner* — Jonathon Cook
(74) *Attorney, Agent, or Firm* — Mattingly & Malur, PC

(57) ABSTRACT

In order to allow to easily specify inspection recipe with which defects desired to be detected can be detected efficiently, a defect inspection apparatus performs defect inspection of a substrate in accordance with a plurality of inspection recipes and produces defect information associated with position of defect in the substrate and attribute data of the defect for each of the inspection recipes and a defect review apparatus produces review result information specifying a kind of defect selected from defects contained in the defect information. An analyzing apparatus obtains defect information and review result information and totalizes the number of defects having attribute data similar to attribute data possessed in defects corresponding to kind of defects to be analyzed for each inspection recipe.

13 Claims, 17 Drawing Sheets

FIG.3

| | 161a | 161b | 161c | 161d | 161e | 161f | 161g | 161h |
|---|---|---|---|---|---|---|---|---|
| | DEFECT ID | CHIP COORDINATE X | CHIP COORDINATE Y | INTRA-CHIP COORDINATE DX | INTRA-CHIP COORDINATE DY | ATTRIBUTE DATA A151 | ATTRIBUTE DATA A152 | ATTRIBUTE DATA A153 |
| | 1 | 2 | 6 | 64 | 17 | 130 | 58 | 2345 |
| | 2 | 3 | 4 | 77 | 49 | 65 | 81 | 1055 |
| | 3 | 4 | 9 | 14 | 52 | 73 | 86 | 1230 |
| | 4 | 5 | 6 | 69 | 31 | 103 | 83 | 1028 |
| | 5 | 5 | 10 | 41 | 25 | 132 | 54 | 2310 |
| | 6 | 6 | 2 | 71 | 43 | 211 | 113 | 954 |
| | 7 | 7 | 5 | 83 | 47 | 69 | 89 | 1051 |
| | 8 | 7 | 9 | 72 | 38 | 205 | 112 | 1032 |
| | 9 | 8 | 3 | 39 | 22 | 140 | 58 | 2391 |
| | 10 | 8 | 7 | 54 | 65 | 141 | 60 | 2425 |
| | 11 | 9 | 1 | 70 | 19 | 137 | 63 | 2411 |
| | 12 | 9 | 7 | 34 | 48 | 91 | 71 | 1543 |
| | 13 | 10 | 3 | 45 | 40 | 199 | 113 | 1105 |

| LOGICAL SUM ID | CHIP COORDINATE RX | CHIP COORDINATE RY | INTRA-CHIP COORDINATE DX | INTRA-CHIP COORDINATE DY | REVIEW RESULT |
|---|---|---|---|---|---|
| 2 | 4 | 4 | 77 | 49 | Particle |
| 5 | 6 | 7 | 41 | 25 | Pattern |
| 8 | 8 | 3 | 72 | 38 | Detection Error |
| 10 | 10 | 3 | 54 | 65 | Pattern |
| 11 | 11 | 9 | 70 | 19 | Pattern |
| 14 | 6 | 10 | 11 | 21 | Detection Error |
| 17 | 13 | 4 | 48 | 89 | Pattern |
| 20 | 9 | 6 | 22 | 91 | Particle |

FIG.6

| LOGICAL SUM ID | DEFECT ID (RECIPE R161) | DEFECT ID (RECIPE R162) | DEFECT ID (RECIPE R163) |
|---|---|---|---|
| 1 | 1 | – | 1 |
| 2 | 2 | 1 | 2 |
| 3 | 3 | – | – |
| 4 | 4 | 2 | 5 |
| 5 | 5 | 4 | 6 |
| 6 | 6 | – | – |
| 7 | 7 | 5 | 7 |
| 8 | 8 | – | 8 |
| 9 | 9 | – | – |
| 10 | 10 | 6 | – |
| 11 | 11 | – | 12 |
| 12 | 12 | 8 | – |
| 13 | 13 | 11 | 13 |
| 14 | – | 3 | – |
| 15 | – | 7 | 15 |
| 16 | – | 9 | 16 |
| 17 | – | 10 | 17 |
| 18 | – | – | 3 |
| 19 | – | – | 4 |
| 20 | – | – | 9 |
| 21 | – | – | 10 |
| 22 | – | – | 11 |
| 23 | – | – | 14 |

FIG.7

| LOGICAL SUM ID | CHIP COORDINATE RX | CHIP COORDINATE RY | INTRA-CHIP COORDINATE DX | INTRA-CHIP COORDINATE DY |
|---|---|---|---|---|
| 2 | 4 | 4 | 77 | 49 |
| 5 | 6 | 7 | 41 | 25 |
| 8 | 8 | 3 | 72 | 38 |
| 10 | 10 | 3 | 54 | 65 |
| 11 | 11 | 9 | 70 | 19 |
| 14 | 6 | 10 | 11 | 21 |
| 17 | 13 | 4 | 48 | 89 |
| 20 | 9 | 6 | 22 | 91 |

FIG.10

| LOGICAL SUM ID | DEFECT ID (RECIPE R161) | DEFECT ID (RECIPE R162) | DEFECT ID (RECIPE R163) | REVIEW RESULT |
|---|---|---|---|---|
| 5 | 5 | 4 | 6 | Pattern |
| 10 | 10 | 5 | - | Pattern |
| 11 | 11 | - | 12 | Pattern |
| 17 | - | 10 | 17 | Pattern |

FIG.11

| DEFECT ID | ATTRIBUTE DATA A151 | ATTRIBUTE DATA A152 | ATTRIBUTE DATA A153 |
|---|---|---|---|
| 5 | 132 | 54 | 2310 |
| 10 | 141 | 60 | 2425 |
| 11 | 137 | 63 | 2411 |

FIG.17

| LOGICAL SUM ID | MAHALANOBIS DISTANCE (RECIPE R161) | MAHALANOBIS DISTANCE (RECIPE R162) | MAHALANOBIS DISTANCE (RECIPE R163) |
|---|---|---|---|
| 1 | 1.17 | – | 0.982 |
| 2 | 251.2 | 105.9 | 328.3 |
| 3 | 230.2 | – | – |
| 4 | 90.59 | 213.5 | 152.3 |
| 5 | 0.446 | 0.890 | 1.13 |
| 6 | 90.92 | – | – |
| 7 | 266.4 | 138.4 | 203.3 |
| 8 | 77.39 | – | 123.0 |
| 9 | 0.539 | – | – |
| 10 | 0.445 | 0.550 | – |
| 11 | 0.445 | – | 0.309 |
| 12 | 96.25 | 105.2 | – |
| 13 | 66.8 | 38.9 | 53.1 |
| 14 | – | 121.5 | – |
| 15 | – | 0.445 | 0.805 |
| 16 | – | 148.0 | 133.5 |
| 17 | – | 0.515 | 0.780 |
| 18 | – | – | 55.9 |
| 19 | – | – | 0.543 |
| 20 | – | – | 107.3 |
| 21 | – | – | 213.8 |
| 22 | – | – | 0.683 |
| 23 | – | – | 253.5 |

FIG.18

| LOGICAL SUM ID | EUCLID DISTANCE (RECIPE R161) | EUCLID DISTANCE (RECIPE R162) | EUCLID DISTANCE (RECIPE R163) |
|---|---|---|---|
| 1 | 2.581 | – | 3.415 |
| 2 | 722.9 | 437.8 | 805.4 |
| 3 | 571.1 | – | – |
| 4 | 548.8 | 718.4 | 813.8 |
| 5 | 3.578 | 2.888 | 4.03 |
| 6 | 928.5 | – | – |
| 7 | 718.0 | 548.1 | 910.4 |
| 8 | 826.3 | – | 525.5 |
| 9 | 0.615 | – | – |
| 10 | 1.441 | 1.805 | – |
| 11 | 0.981 | – | 1.514 |
| 12 | 288.2 | 105.2 | – |
| 13 | 744.1 | 388.9 | 543.2 |
| 14 | – | 521.5 | – |
| 15 | – | 3.411 | 4.833 |
| 16 | – | 448.0 | 133.5 |
| 17 | – | 2.358 | 4.780 |
| 18 | – | – | 234.9 |
| 19 | – | – | 4.555 |
| 20 | – | – | 601.1 |
| 21 | – | – | 813.8 |
| 22 | – | – | 3.680 |
| 23 | – | – | 1053.2 |

ANALYZING APPARATUS, PROGRAM, DEFECT INSPECTION APPARATUS, DEFECT REVIEW APPARATUS, ANALYSIS SYSTEM, AND ANALYSIS METHOD

INCORPORATION BY REFERENCE

The present application claims priority from Japanese application JP2007-067849 filed on Mar. 16, 2007, the content of which is hereby incorporated by reference into this application.

BACKGROUND OF THE INVENTION

The present invention relates to the technique of analyzing a plurality of inspection recipes set in a defect inspection apparatus.

A defect inspection apparatus which optically or electronically inspects products made of thin film such as semiconductor integrated circuits, magnetic heads and flat panel displays requires to set inspection recipes (inspection conditions) for performing optical or electronic processing such as parameters including laser intensity, contrast of image and threshold for image processing in accordance with deposition condition, wiring material and the like properly.

In this respect, JP-A-2005-17159 discloses the technique that a plurality of inspection recipes are prepared previously to perform defect inspection in accordance with the plurality of inspection recipes, so that a large number of obtained defect coordinates are compared with one another among the inspection recipes to judge that defects having near defect coordinates are the same defects so as to reduce the number of defects, so that the reduced defects can be observed by a defect review apparatus to thereby select suitable inspection recipes.

In the technique disclosed in JP-A-2005-17159, it is judged that the defects having near defect coordinates are the same defects to reduce the number of defects and the reduced defects are observed by the defect review apparatus, although a recent defect inspection apparatus produces thousands of or tens of thousands of defect coordinates at one inspection and accordingly it takes time and is difficult to observe all of these defects by the defect review apparatus.

SUMMARY OF THE INVENTION

Accordingly, it is an object of the present invention to provide the technique capable of easily specifying inspection recipe with which defects desired to be detected can be detected efficiently.

In order to solve the above problem, according to the present invention, the number of defects having attribute data similar to attribute data possessed in defects corresponding to kind of defects to be analyzed is totalized from result of performing defect inspection in accordance with a plurality of inspection recipes for each inspection recipe.

According to the present invention, for example, an analyzing apparatus which analyzes a plurality of inspection recipes set in a defect inspection apparatus includes a memory part to store defect information associated with position of defect in a substrate and attribute data of the defect and review result information specifying kind of defect selected from defects contained in the defect information and a control part, and the control part performs processing of receiving inputted kind of defects to be analyzed, processing of obtaining attribute data of defects corresponding to the inputted kind of defects contained in the review result information from the defect information and calculating a reference value from the obtained attribute data for each inspection recipe, processing of calculating distance from the reference value for all defects contained in the defect information for each inspection recipe, and processing of totalizing the number of defects having the distance from the reference value shorter than or equal to a predetermined threshold for each inspection recipe.

As described above, according to the present invention, inspection recipe with which defects desired to be detected can be detected efficiently can be specified easily.

Other objects, features and advantages of the invention will become apparent from the following description of the embodiments of the invention taken in conjunction with the accompanying drawings.

BRIEF DESCRIPTION OF THE DRAWINGS

FIG. 3 is a schematic diagram showing a defect table;

FIG. 6 is a schematic diagram showing a logical sum table;

FIG. 7 is a schematic diagram showing a sampling table;

FIG. 10 is a schematic diagram showing an analysis designation table;

FIG. 11 is a schematic diagram showing an attribute data table;

FIG. 17 is a schematic diagram 1 showing a distance table;

FIG. 18 is a schematic diagram 2 showing a distance table;

DETAILED DESCRIPTION OF THE EMBODIMENTS

Figure 1:
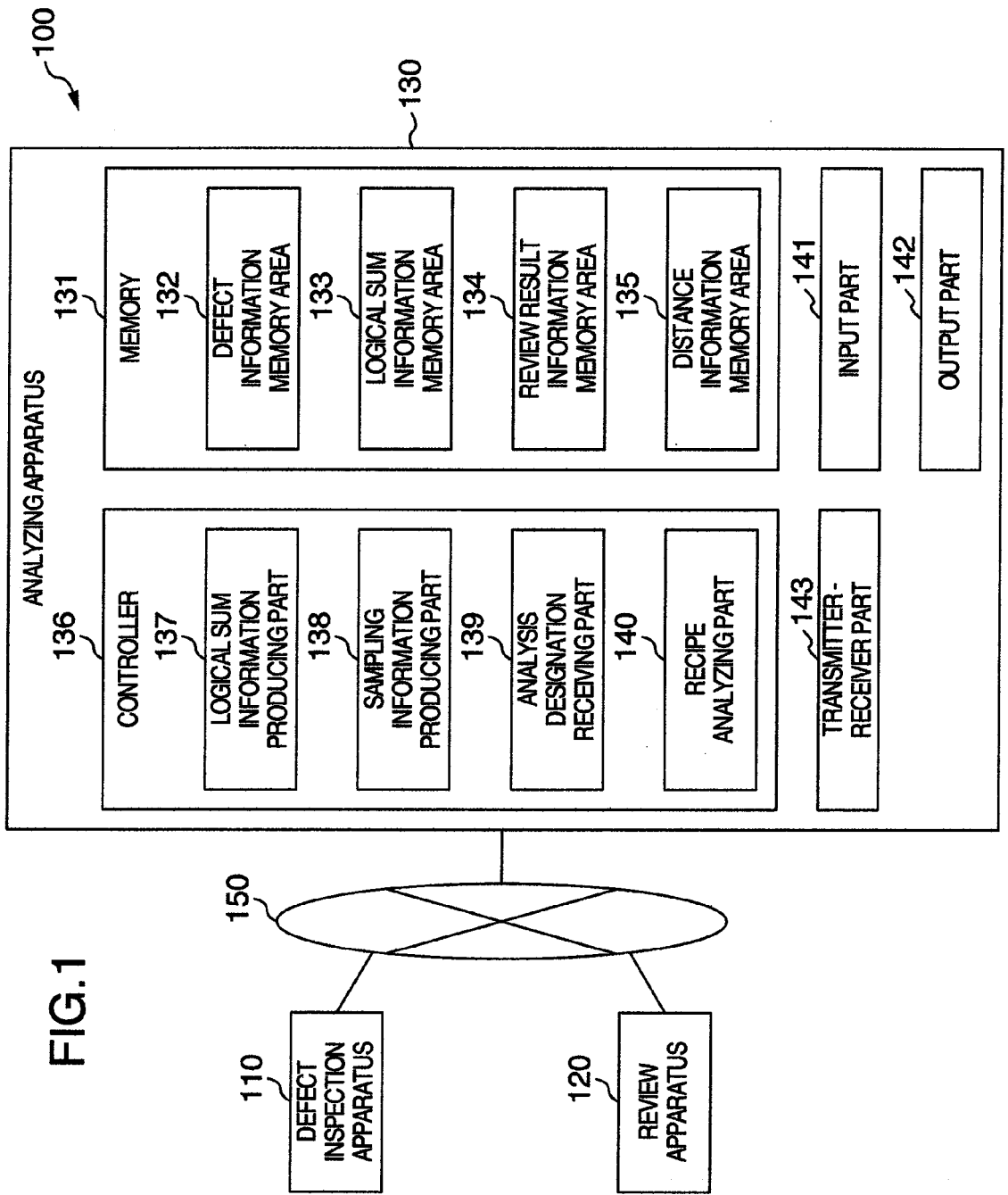
FIG. 1 is a block diagram schematically illustrating an inspection system according to a first embodiment of the present invention.

FIG. 1 is a block diagram schematically illustrating an inspection system 100 according to a first embodiment of the present invention.

As shown in FIG. 1, the inspection system 100 includes a defect inspection apparatus 110, a defect review apparatus 120 and an analyzing apparatus 130, which are connected through a network 150 to one another to transmit and receive information through the network 150 mutually.

The defect inspection apparatus 110 may use a particle inspection apparatus, a pattern inspection apparatus or the like.

The particle inspection apparatus irradiates a substrate with laser light obliquely from above to detect scattered light therefrom and is sometimes named a dark-field inspection apparatus. The pattern inspection apparatus takes an image of circuit pattern to detect position of defect by means of image processing and contains a bright-field inspection apparatus and a scanning electron microscope (SEM) type inspection apparatus in accordance with a detector to which the apparatus is applied.

The defect inspection apparatus 110 may use a known apparatus and accordingly detailed description thereof is omitted, although in the embodiment the defect inspection apparatus is adapted to output, as a minimum, information specifying coordinates of defect and attribute data of the defect in accordance with inputted inspection recipes.

Since the defect inspection apparatus is to detect defect on circuit pattern formed on a substrate to be inspected, it requires to set proper inspection recipes in accordance with deposition state of the substrate and formation state of the circuit pattern.

The inspection recipes contain circuit pattern conditions and optics and image processing conditions.

The circuit pattern conditions contain parameters including size and arrangement of chips or dice formed on a substrate and area information within each chip according to the inspection algorithm of the inspection apparatus. On the other hand, the optics and image processing conditions contain parameters such as laser intensity according to the deposition condition and wiring material, contrast condition of the image captured by a detector and threshold in image processing and are to decide the detection sensitivity. In the embodiment, the optics and image processing conditions are set so that desired defects can be detected exactly in a short time.

Figure 2:
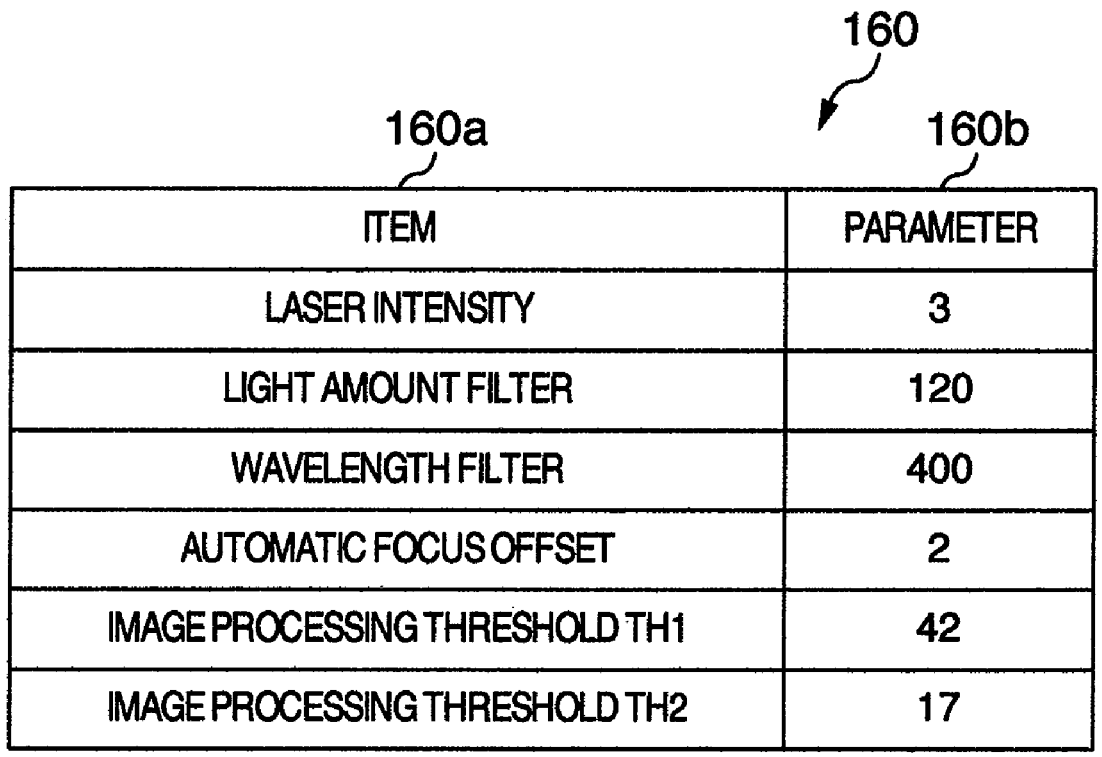
FIG. 2 is a schematic diagram showing an inspection recipe table.

For example, FIG. 2 is a schematic diagram showing an inspection recipe table 160 for specifying the inspection recipes (inspection conditions) inputted to the defect inspection apparatus 110.

As shown in FIG. 2, the inspection recipe table 160 includes an item column 160a and a parameter column 160b.

Information for specifying items for inspection conditions set as inspection recipes is stored in the item column 160a. In the embodiment, for example, laser intensity, light amount filter, wavelength filter, automatic focus offset, image processing thresholds TH1 and TH2 are set as items of the inspection recipes, although the items are not limited thereto.

Information for specifying values (parameters) set in the items of the inspection recipes specified in the item column 160a is stored in the parameter column 160b.

The defect inspection apparatus 110 performs defect inspection in accordance with the inspection recipes specified in the inputted inspection recipe table 160 and outputs defect information including, as a minimum, information specifying a position of a detected defect and information specifying attribute data of the defect.

As the defect information, a defect table 161 as shown in FIG. 3, for example, is outputted.

As shown in FIG. 3, the defect table 161 includes a defect ID column 161a, a chip coordinate RX column 161b, a chip coordinate RY column 161c, an intra-chip coordinate DX column 161d, an intra-chip coordinate DY column 161e, an attribute data A151 column 161f, an attribute data A152 column 161g and an attribute data A153 column 161h.

An defect ID which is identification information for uniquely identifying the detected defect is stored in the defect ID column 161a. In the embodiment, defects detected by the defect inspection apparatus 110 are assigned the defect ID successively in order of detection.

Information for specifying a position in the substrate of the defect specified in the defect ID column 161a is stored in the chip coordinate RX column 161b, the chip coordinate RY column 161c, the intra-chip coordinate DX column 161d and the intra-chip coordinate DY column 161e.

Figure 4:
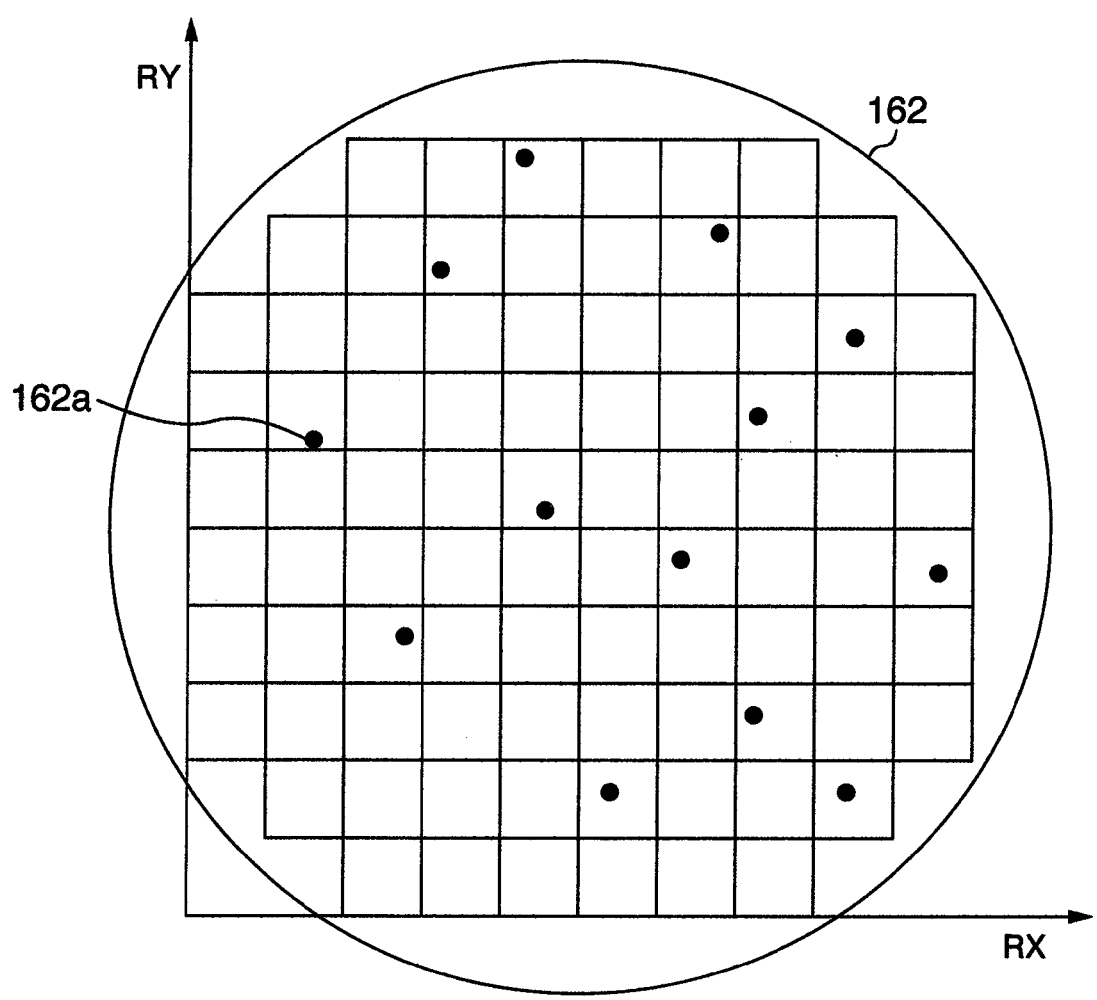
FIG. 4 schematically illustrates a substrate.

In this respect, in the embodiment, as shown in FIG. 4 (schematically illustrating the substrate 162), the positions of defects are specified by specifying positions of chip formed on the substrate 162 and positions of defects within the chip.

For example, the chips formed on the substrate 162 are assigned serial numbers of RX=1, 2, 3, . . . for columns formed in order from a predetermined origin position in the X-axis direction (RX) and also assigned serial numbers of RY=1, 2, 3, . . . for rows formed in the Y-axis direction (RY) from the lowest row in the columns.

The order (position) in the X-axis direction is stored in the chip coordinate RX column 161b and the order (position) in the Y-axis direction is stored in the chip coordinate RY column 161c. For example, in case of a defect 162a in FIG. 4, the chip coordinate RX=2 and the chip coordinate RY=6.

Moreover, coordinates (DX=1, 2, 3, . . . ) from the origin in the X-axis direction and coordinates (DY=1, 2, 3, . . . ) from the origin in the Y-axis direction are assigned to the inside of each chip, so that a position of a defect within the chip can be specified by these coordinates.

Thus, the coordinate in the X-axis direction is stored in the intra-chip coordinate DX column 161d and the coordinate in the Y-axis direction is stored in the intra-chip coordinate DY column 161e.

The attribute data of defect detected by the defect inspection apparatus 110 is different depending on makers of the inspection apparatuses, although the attribute data is data obtained as the result of the image processing when the defect inspection apparatus detects a defect and contains size, concentration and peripheral length of the defect, for example.

In the embodiment, the size, the concentration and the peripheral length of the defect specified in the defect ID column 161a are stored in the attribute data A151 column 161f, the attribute data A152 column 161g and the attribute data A153 column 161h, respectively, although the present invention is not limited thereto.

The defect information outputted by the defect inspection apparatus 110 is transmitted through the network 150 to the analyzing apparatus 130.

The defect review apparatus 120 obtains image information in a specified position.

The defect review apparatus 120 may use an apparatus using a scanning electron microscope (SEM) or an atomic force microscope (AFM) and obtains image information of the defect detected by the defect review apparatus 120 by using the same coordinates as those in the defect inspection apparatus 110 or by using a correspondence table of the coordinates used in the defect inspection apparatus 110 and the coordinates used in the defect review apparatus 120.

An operator of the defect review apparatus 120 inputs identification information (defect name in the embodiment) for identifying a kind of each defect by means of an input unit (not shown) while using the image information of each defect obtained by the defect review apparatus 120 and produces review result information relating the defects to the kinds thereof to transmit it through the network 150 to the analyzing apparatus 130.

Figure 5:
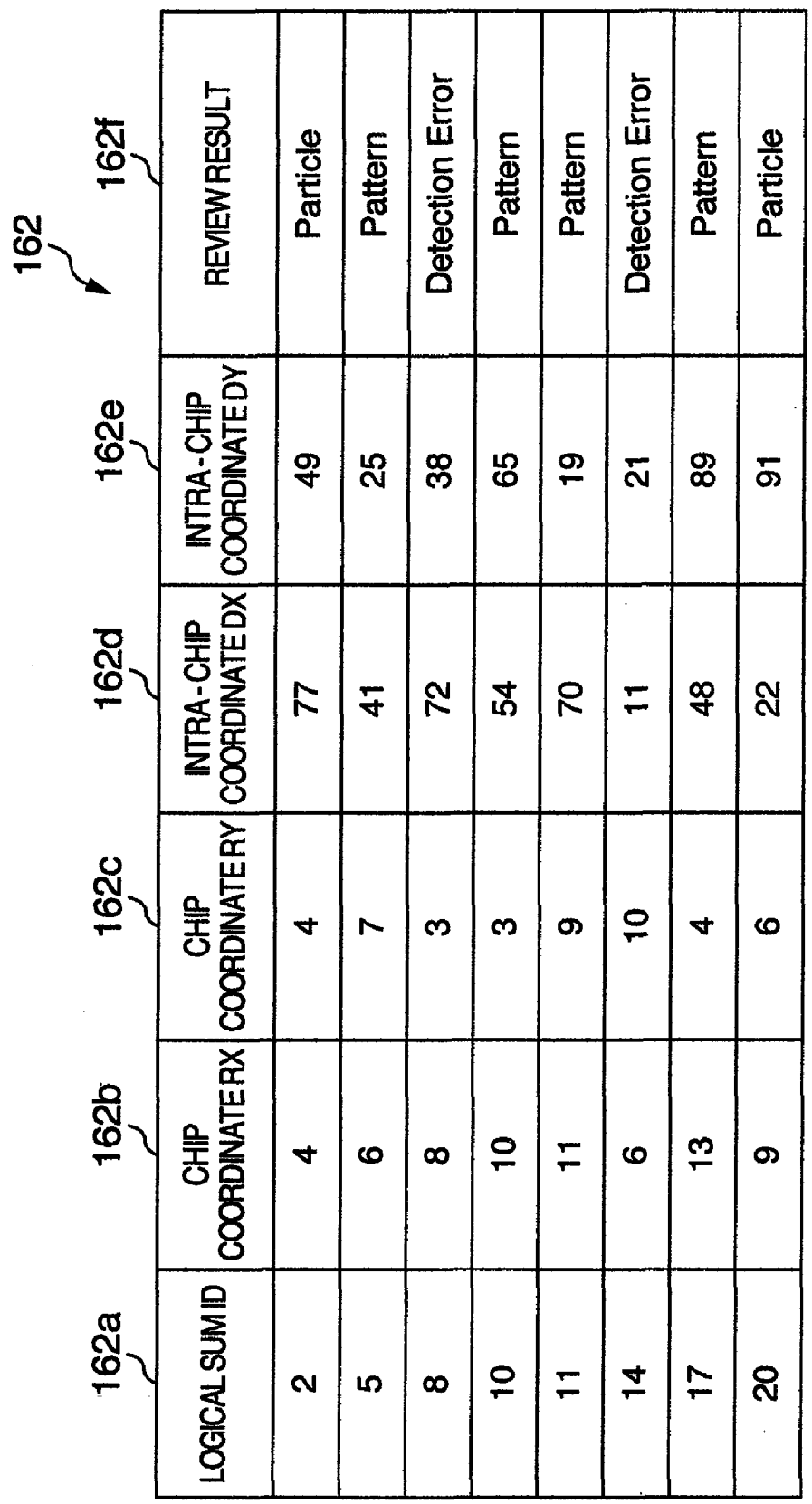
FIG. 5 is a schematic diagram showing a review result table.

In the embodiment, for example, the defect review apparatus 120 produces a review result table 162 as shown in FIG. 5 and transmit it to the analyzing apparatus 130.

As shown in FIG. 5, the review result table 162 includes a logical sum ID column 162a, a chip coordinate RX column 162b, a chip coordinate RY column 162c, an intra-chip coordinate DX column 162d, an intra-chip coordinate DY column 162e and a review result column 162f.

Stored in the logical sum ID column 162a, the chip coordinate RX column 162b, the chip coordinate RY column 162c, the intra-chip coordinate DX column 162d and the intra-chip coordinate DY column 162e are values stored in corresponding columns of a sampling table 137a described later.

Information specifying the kind of the defect inputted by reviewing the defect specified in the logical sum ID column 162a, the chip coordinate RX column 162b, the chip coordinate RY column 162c, the intra-chip coordinate DX column 162d and the intra-chip coordinate DY column 162e is stored in the review result column 162f. In the embodiment, a defect name is stored as the information specifying the kind of the defect, although the present invention is not limited thereto.

The analyzing apparatus 130 includes a memory 131, a controller 136, an input part 141, an output part 142 and a transmitter-receiver part 143.

The memory 131 includes a defect information memory area 132, a logical sum information memory area 133, a review result information memory area 134 and a distance information memory area 135.

Defect information received from the defect inspection apparatus 110 is stored in the defect information memory area 132. In the embodiment, for example, the defect table 161 as shown in FIG. 3 is stored for each inspection recipe as the defect information.

Logical sum information of defect produced by a logical sum information producing part 137 described later is stored in the logical sum information memory area 133. The logical sum information of defect is described later.

The review result table 162 containing review result information received from the defect review apparatus 120 is stored in the review result information memory area 134.

Distance information produced by a recipe analyzing part 140 described later is stored in the distance information memory area 135. The distance information is described later.

The controller 136 includes a logical sum information producing part 137, a sampling information producing part 138, an analysis designation receiving part 139 and a recipe analyzing part 140.

The logical sum information producing part 137 reads in the defect table 161 for each inspection recipe stored in the defect information memory area 132 of the memory 131 and calculates distance between defects detected in accordance with the inspection recipes, so that the defects having the distance smaller than or equal to a predetermined threshold are regarded as the same defect to produce logical sum information which is the totalized result of all defects detected in accordance with the inspection recipes and store it in the logical sum information memory area 133 of the memory 131.

In the embodiment, the logical sum information producing part 137 produces a logical sum table 137a shown in FIG. 6, for example, and stores it in the logical sum information memory area 133 of the memory 131.

As shown in FIG. 6, the logical sum table 137a includes a logical sum ID column 137b, a defect ID (recipe R161) column 137c, a defect ID (recipe R162) column 137d and a defect ID (recipe R163) column 137e.

Logical sum IDs which are identification information for identifying defects detected in accordance with inspection recipes are stored in the logical sum ID column 137b.

In the embodiment, each of defects detected in accordance with a recipe R161, defects not detected in accordance with the recipe R161 but detected in accordance with a recipe R162 and defects not detected in accordance with the recipe R161 but detected in accordance with a recipe R163 is assigned a logical sum ID so that the logical sum ID is a serial number in order of detection in each recipe.

Defect IDs of defects detected in accordance with the recipe R161 are stored in the defect ID (recipe R161) column 137c. As the defect IDs of defects detected in accordance with the recipe R161, those stored in the defect ID column 161a of the defect table 161 of defects detected in accordance with the recipe R161 are used.

Defect IDs of defects detected in accordance with the recipe R162 are stored in the defect ID (recipe R162) column 137d.

In this connection, When the defects detected in accordance with the recipe R162 are separated by the distance shorter than or equal to a predetermined threshold from the coordinates of the defect detected in accordance with the recipe R161, the defect IDs of the defects detected in accordance with the recipe R162 are stored in the defect ID (recipe R162) column 137d in a corresponding manner to the defect IDs of the defect detected in accordance with the recipe R161 (in the same row).

On the other hand, a new entry is prepared in the logical sum table 137a for the defect not detected in accordance with the recipe R161, that is, the defect separated from any coordinates of defects detected in accordance with the recipe R161 by the distance longer than the predetermined threshold and the defect ID of defect detected in accordance with the recipe R162 is stored therein. In this case, identification information ("-" in the embodiment) indicating that there is no pertinent defect is stored in the defect ID (recipe R161) column 137c in the new entry prepared in the logical sum table 137a.

As the defect IDs of defects detected in accordance with the recipe R162, those stored in the defect ID column 161a of the defect table 161 of defects detected in accordance with the recipe R162 are also used.

Defect IDs of defects detected in accordance with the recipe R163 are stored in the defect ID (recipe R163) column 137e.

In this connection, when the defects detected in accordance with the recipe R163 are separated by the distance shorter than or equal to a predetermined threshold from the coordinates of the defect detected in accordance with the recipe R161 or R162, the defect IDs of the defects detected in accordance with the recipe R163 are stored in the defect ID (recipe R163) column 137e in a corresponding manner (in the same row) to the defect IDs of the defect detected in accordance with the recipe R161 or R162 and separated therefrom by the distance shorter than or equal to the threshold.

On the other hand, a new entry is prepared in the logical sum table 137a for the defect not detected in accordance with the recipes R161 and 162, that is, the defect separated from any coordinates of defects detected in accordance with the recipes R161 and R162 by the distance longer than the predetermined threshold and the defect ID of defect detected in accordance with the recipe R163 is stored therein. In this case, identification information ("-" in the embodiment) indicating that there is no pertinent defect is stored in the defect ID (recipe R161) column 137c and the defect ID (recipe R162) column 137d in the new entry prepared in the logical sum table 137a.

Further, as the defect IDs of defects detected in accordance with the recipe R163, those stored in the defect ID column 161a of the defect table 161 of defects detected in accordance with the recipe R163 are also used.

In the logical sum table 137a described above, defects are detected in accordance with three kinds of inspection recipes R161, R162 and R163 by way of example, although the number of inspection recipes is not limited to three.

The sampling information producing part 138 produces sampling information specifying sampling for distinguishing a kind of defect from the logical sum information stored in the logical sum information memory area 133.

In the embodiment, for example, the sampling information producing part 138 extracts a predetermined number of logical sum IDs from the logical sum table 137a stored in the logical sum information memory area 133 at random or in accordance with a predetermined rule and specifies coordinates of the defects corresponding to the logical sum IDs from the defect information memory area 132, so that the sampling information producing part 138 produces the sampling information having the logical sum IDs and information specifying positions of the defects corresponding to the logical sum IDs.

As the sampling information, for example, a sampling table 138a as shown in FIG. 7 is produced.

As shown in FIG. 7, the sampling table 138a includes a logical sum ID column 138b, a chip coordinate RX column 138c, a chip coordinate RY column 138d, an intra-chip coordinate DX column 138e and an intra-chip coordinate DY column 138f.

Logical sum IDs extracted from the logical sum table 137a are stored in the logical sum ID column 138b.

As positions of the defects corresponding to the logical sum IDs specified by the logical sum ID column 138b, values stored in the chip coordinate RX column 161b, the chip coordinate RY column 161c, the intra-chip coordinate DX column 161 and the intra-chip coordinate DY column 161e of the defect table 161 stored in the defect information memory area 132 are stored in the chip coordinate RX column 138c, the chip coordinate RY column 138d, the intra-chip coordinate DX column 138e and the intra-chip coordinate DY column 138f.

When there are a plurality of defect IDs corresponding to the logical sum ID extracted from the logical sum table 137a, any one of coordinates thereof, a center position of the plurality of coordinates or a position of the center of gravity of the plurality of coordinates may be stored in the columns.

Moreover, the sampling information producing part 138 transmits the sampling table 138a produced as above to the defect review apparatus 120 by means of the transmitter-receiver part 143 and receives the review result table 162 containing review result information from the defect review apparatus 120 by means of the transmitter-receiver part 143 to store it in the review result information memory area 134 of the memory 131.

The analysis designation receiving part 139 receives information for specifying a kind of defect desired to be detected or information for specifying a king of defect not desired to be detected inputted by means of the input part 141 by the operator of the analyzing apparatus 130.

For example, the analysis designation receiving part 139 displays the review result table 162 stored in the review result information memory area 134 in the display unit constituted by the output part 142 in a predetermined format and receives input of the kind of defect desired or not desired to be detected from the input part 141 in the above display.

The recipe analyzing part 140 performs processing of specifying the inspection recipe with which the kinds of defects desired to be detected and designated by the analysis designation receiving part 139 are detected maximally or with which the kinds of defects not desired to be detected and designated by the analysis designation receiving part 139 are detected minimally.

For example, the recipe analyzing part 140 obtains the logical sum ID corresponding to the kind of defect desired to be detected from the review result table 162 when the kind of defect desired to be detected is designated by the analysis designation receiving part 139 and specifies the defect ID corresponding to the obtained logical sum ID from the logical sum table 137a.

The recipe analyzing part 140 specifies from the defect table 161 the attribute data of the defect ID specified from the logical sum table 137a and produces a reference value of each attribute data for each recipe.

Further, the recipe analyzing part 140 judges the similarity of the attribute data of each detected defect and the reference value of each attribute data for each recipe.

The recipe analyzing part 140 specifies the inspection recipe with which the defects having the attribute data similar to the reference value of the attribute data of the defect desired to be detected and designated by the analysis designation receiving part 139 are detected maximally.

The inspection recipe specified as above is outputted through the output part 142 as the inspection recipe with which the kinds of defects desired to be detected and designated by the analysis designation receiving part 139 are detected maximally.

On the other hand, the recipe analyzing part 140 obtains the logical sum ID corresponding to the kind of defect not desired to be detected from the review result table 162 when the kind of defect not desired to be detected is designated by the analysis designation receiving part 139 and specifies the defect ID corresponding to the obtained logical sum ID from the logical sum table 137a.

The recipe analyzing part 140 specifies from the defect table 161 the attribute data of the defect ID specified from the logical sum table 137a and produces the reference value of each attribute data for each recipe.

Moreover, the recipe analyzing part 140 judges the similarity of the attribute data of each detected defect and the reference value of each attribute data for each recipe.

The recipe analyzing part 140 specifies the inspection recipe with which the defects having the attribute data similar to the reference value of the attribute data of the defect not desired to be detected and designated by the analysis designation receiving part 139 are detected minimally.

The inspection recipe specified as above is outputted through the output part 142 as the inspection recipe with which the kinds of defect not desired to be detected and designated by the analysis designation receiving part 139 are detected maximally.

The input part 141 receives input information from the operator of the analyzing apparatus 130.

The output part 142 output information to the operator of the analyzing apparatus 130.

The transmitter-receiver part 143 is an interface for transmitting and receiving information through the network 150.

Figure 8:
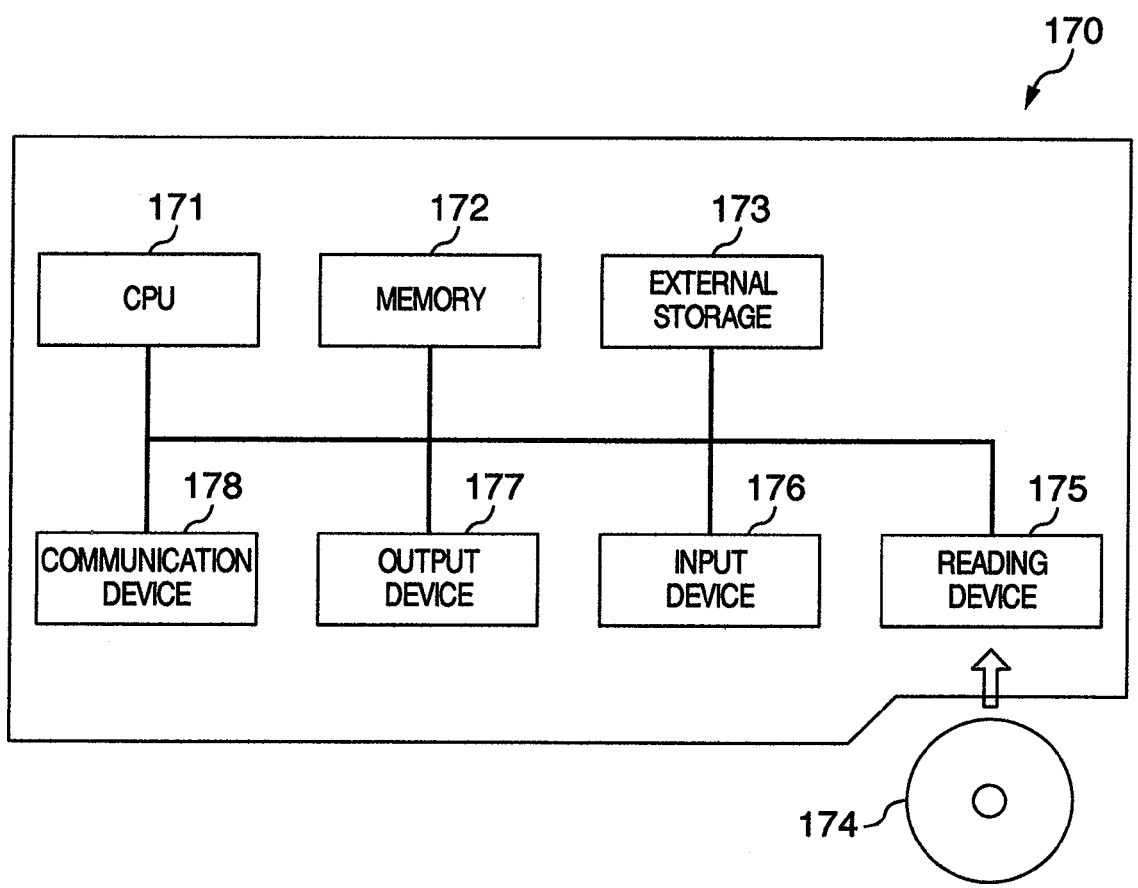
FIG. 8 is a block diagram schematically illustrating a computer.

The analyzing apparatus 130 described above can be realized by a general computer 170, for example, as shown in FIG. 8 including a central processing unit (CPU) 171, a memory 172, an external storage 173 such as a hard disk drive (HDD), a reading device 175 for reading out information from a storage medium 174 having the portability such as CD-ROM and DVD-ROM, an input device 176 such as a keyboard and a mouse, an output device 177 such as a display and a communication device 178 such as a network interface card (NIC) for connection with a communication network.

For example, the memory 131 can be realized by the external storage 173 and the controller 136 can be realized by loading a predetermined program stored in the external storage 173 into the memory 172 and executing the program by the CPU 171. The input part 141 can be realized by the input device 176 and the output part 142 can be realized by the output device 177. The transmitter-receiver part 140 can be realized by the communication device 178.

The predetermined program may be down-loaded from the storage medium 174 through the reading device 175 or from the network through the communication device 178 into the external storage 173 and then loaded into the memory 172 to be executed by the CPU 171 or may be directly loaded from the storage medium 174 through the reading device 175 or from the network through the communication device 178 into the memory 172 and executed by the CPU 171.

Figure 9:
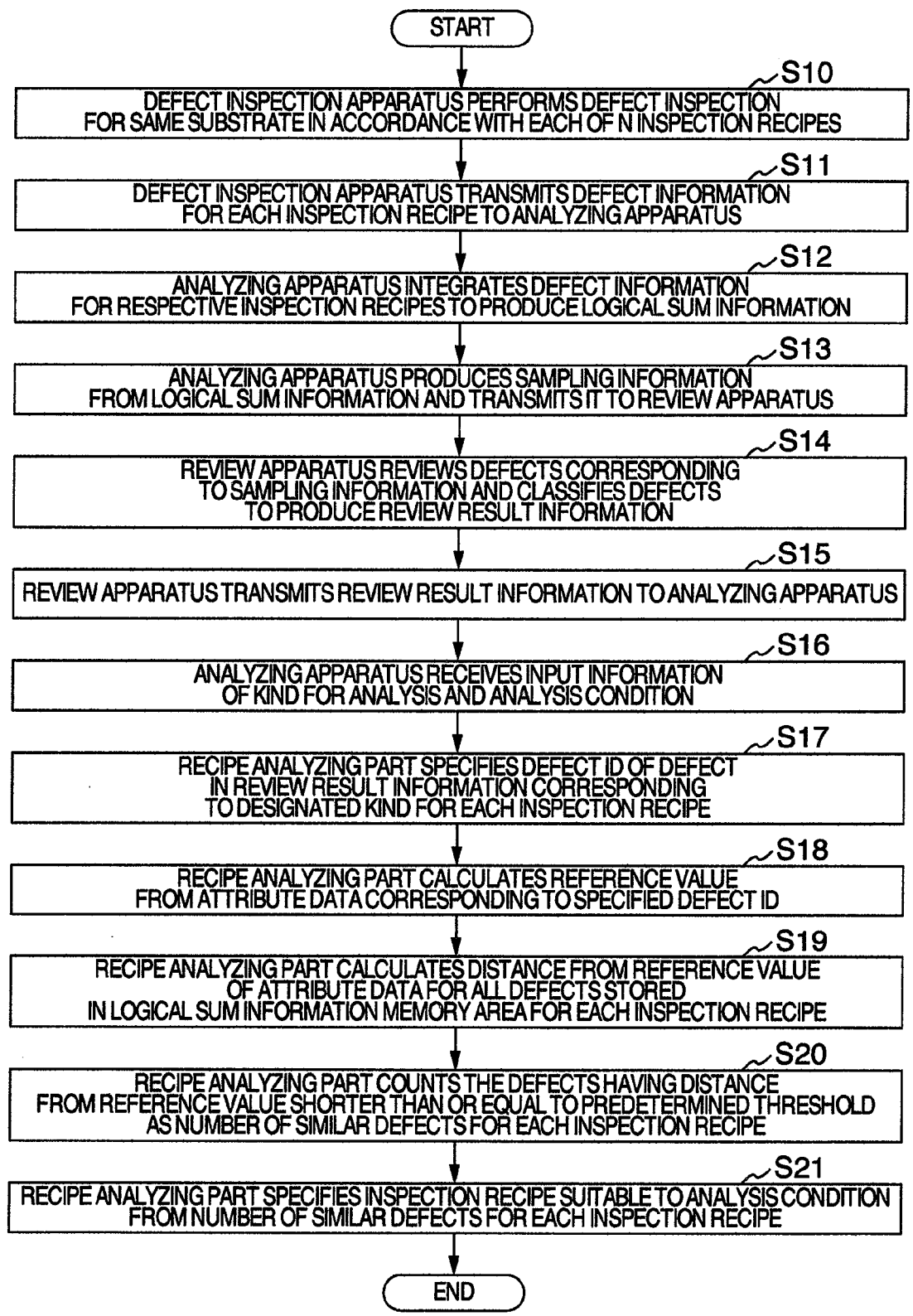
FIG. 9 is a flow chart showing processing of the inspection system 100.

FIG. 9 is a flow chart showing processing of the inspection system 100 described above.

First, N (N is a natural number larger then or equal to 2) different inspection recipes are inputted to the defect inspection apparatus 110, so that the defect inspection apparatus 110 performs defect inspection for the same substrate by N times while using the inspection conditions specified by the inspection recipes (step S10).

Next, the defect inspection apparatus 110 produces the defect table 161 for each inspection recipe and transmits it to the analyzing apparatus 130 through the network 150 (step S11). The method of transmitting and receiving data between the apparatuses may be the form that the defect inspection apparatus 110 puts the defect table 161 to the analyzing apparatus 130 or the form that the analyzing apparatus 130 gets the defect table 161 from the defect inspection apparatus 110.

In the analyzing apparatus 130 which has received the defect table 161 from the defect inspection apparatus 110, the logical sum information producing part 137 stores the defect table 161 into the defect information memory area 132 and calculates distance between individual defect coordinates among the inspection recipes, so that the logical sum information producing part 137 judges that the defects having the defect coordinates separated by the distance shorter than or equal to the predetermined threshold are regarded as the same defects to associate them with one another and produces the logical sum table 137a indicating the total of defects detected by any inspection recipe to store it in the logical sum information memory area 133 (step S12).

Then, the sampling information producing part 138 of the analyzing apparatus 130 samples a plurality of logical sum IDs from the logical sum table 137a to specify the defect IDs corresponding to the logical sum IDs and obtains the position information thereof from the defect table 161, so that the sampling information producing part 138 produces the sampling table 138a and transmits it as the sampling information to the defect review apparatus 120 by means of the transmitter-receiver part 143 (step S13). The method of transmitting and receiving data between apparatuses may be the form that the analyzing apparatus 130 puts data to the defect review apparatus 120 or the form that the defect review apparatus 120 gets data from the analyzing apparatus 130.

The defect review apparatus 120 obtains an image for each defect on the basis of the position information specified by the sampling information obtained in step S13 and receives input information from the operator of the defect review apparatus 120 or by means of the automatic defect classification (ADC) function through the input unit (not shown) to produce the review result table 162 specifying the kinds of defects (step S14) and transmit it as the review result information to the analyzing apparatus 130 through the network (step S15). The method of transmitting and receiving data between apparatuses may be the form that the defect review apparatus 120 puts data to the analyzing apparatus 130 or the form that the analyzing apparatus 130 gets data from the defect review apparatus 130.

In the analyzing apparatus 130 which has obtained the review result information from the defect review apparatus 12, the analysis designation receiving apparatus 139 outputs the information stored in the review result table 162 in the predetermined format and receives input information of the kind for analysis and the analysis condition as to whether the kind is desired to be detected or not through the input part 141 (step S16).

Then, the recipe analyzing part 140 of the analyzing apparatus 130 specifies the logical sum ID having the kind designated by the analysis designation receiving part 139 and the defect contained in the review result information from the review result table 162 and specifies the defect ID corresponding to the specified logical sum ID in the logical sum table 137a (step S17). In this case, the recipe analyzing part 140 may produce an analysis designation table 163 as shown in FIG. 10.

As shown in FIG. 10, the analysis designation table 163 includes a logical sum ID column 163a for storing logical sum IDs, a defect ID (recipe R161) column 163b for storing defect IDs detected in accordance with the recipe R161 (when there is no relevant defect, "-" is entered), a defect ID (recipe R162) column 163c for storing defect IDs detected in accordance with the recipe R162 (when there is no relevant defect, "-" is entered), a defect ID (recipe R163) column 163d for storing defect IDs detected in accordance with the recipe R163 (when there is no relevant defect, "-" is entered) and a review result column 163e for storing the specified kind.

The recipe analyzing part 140 obtains the attribute data corresponding to the defect ID specified in step S17 from the defect table 161 stored in the defect information memory area 132 and calculates the reference value of the attribute data for each of the inspection recipes and the attribute data (step S18). In this case, the recipe analyzing part 140 may produce an attribute data table 164 as shown in FIG. 11 for each inspection recipe and calculate the reference value for each attribute data. The attribute data table 164 shown in FIG. 11 includes a defect ID column 164a for storing defect IDs, an attribute data A151 column 164b for storing attribute data A151, an attribute data A152 column 164c for storing attribute data A152 and an attribute data A153 column 164d for storing attribute data A153.

The concrete calculation method of the reference value will be described with reference to FIGS. 12 and 13.

The recipe analyzing part 140 calculates distance between reference values for each inspection recipe of all the defects detected in accordance with each inspection recipe on the basis of the reference values calculated in step S18 for each inspection recipe (step S19).

The concrete calculation method of the distance will be described with reference to FIGS. 14 and 15.

Figure 16:
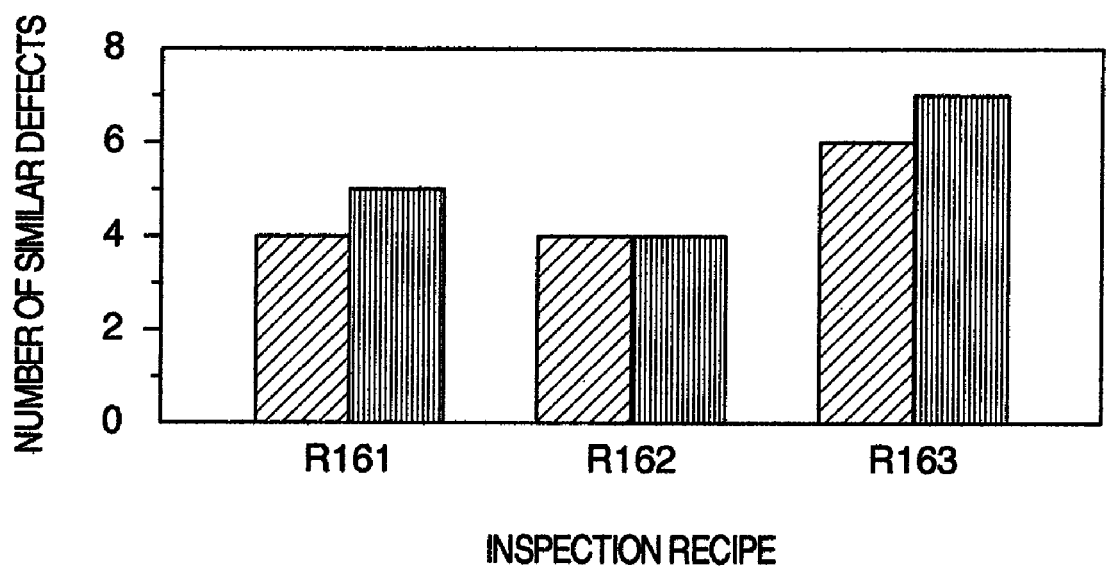
FIG. 16 is a graph illustrating totalized result data.

The recipe analyzing part 140 totalizes the number of defects having the distance calculated in step S19 which is shorter than or equal to predetermined threshold as the number of similar defects for each inspection recipe (step S20). In this case, the recipe analyzing part 140 may produce totalized result data 165 which is the totalized result of the number of similar defects for each inspection recipe as shown in FIG. 16 (schematically illustrating the totalized result data 165), for example, and may output it to the output part 142.

Moreover, the recipe analyzing part 140 outputs to the output part 142 as the analyzed result in the predetermined display format the inspection recipe that the number of totalized similar defects is maximum when the defects of the kind desired to be detected are designated as the analysis condition in step S16 and the inspection recipe that the number of totalized similar defects is minimum when the defects of the kind not desired to be detected are designated as the analysis condition (step S21).

Figure 12:
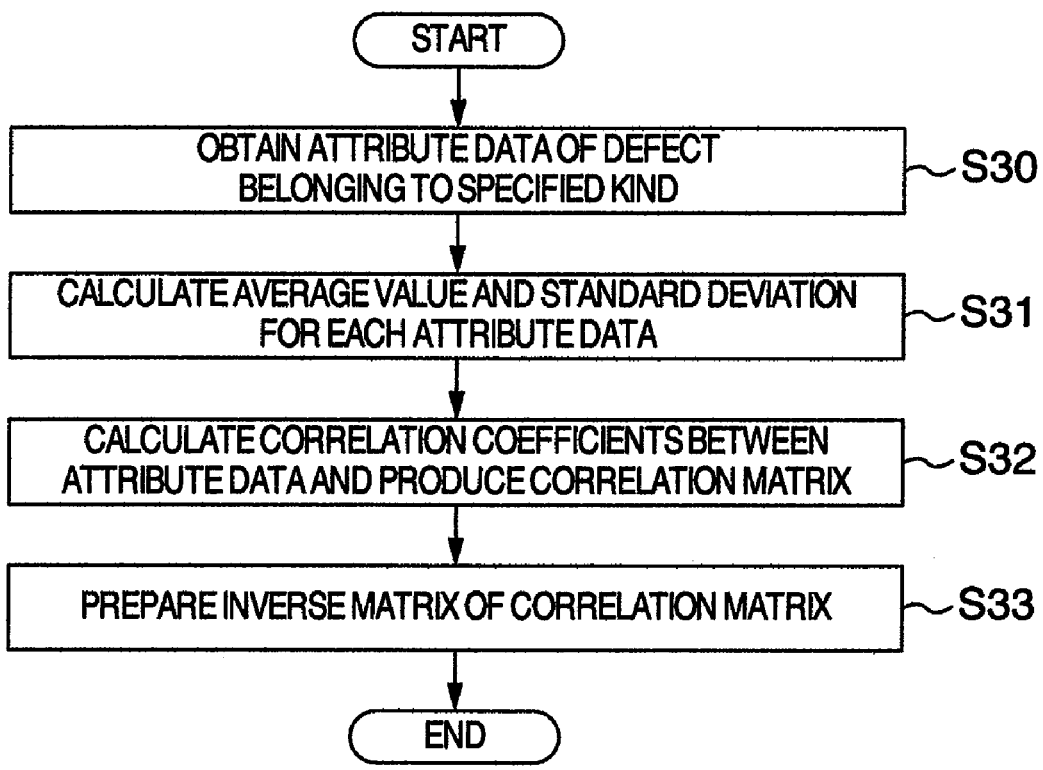
FIG. 12 is a flow chart showing processing of calculating a reference value from attribute data of defect.

FIG. 12 is a flow chart showing processing of calculating the reference value from the attribute data of defects in the recipe analyzing part 140. An example in which Mahalanobis distance is used as the distance defined in step S19 of FIG. 9 is shown in FIG. 12.

First, the recipe analyzing part 140 obtains the attribute data corresponding to the defect ID specified in step S17 of FIG. 9 from the defect table 161 stored in the defect information memory area 132 (step S30).

Next, the recipe analyzing part 140 calculates an average value and a standard deviation for each attribute data in each inspection recipe (step S31).

The average value $m_i$ is calculated by the following expression (1) and the standard deviation $\sigma_i$ is calculated by the following expression (2).

$$m_i = \frac{1}{n}\sum_{j=1}^{n} x_{ij} \quad (1)$$
$$(i = 1, 2, \ldots, k)$$

$$\sigma_i = \sqrt{\frac{1}{n}\sum_{j=1}^{n}(x_{ij} - m_i)^2} \quad (2)$$
$$(i = 1, 2, \ldots, k)$$

In the above expressions, n represents the number of defects sampled in each inspection recipe and i represents an identifier of each attribute data.

Next, the recipe analyzing part 140 produces a correlation matrix from the attribute data obtained in step S30 (step S32).

The correlation matrix is a matrix of the result of calculating correlation coefficients between items of each attribute data. The correlation coefficients can be calculated by the expression (3) and when its results are substituted in the matrix as described in the expression (4), the correlation matrix can be prepared.

$$r_{i_1 i_2} = \frac{1}{n}\sum_{j=1}^{n} X_{i_1 j} Y_{i_2 j} \quad (3)$$
$$(i_1 = 1, 2, \ldots, k)$$
$$(i_2 = 1, 2, \ldots, k)$$
$$(j = 1, 2, \ldots, n)$$

$$\begin{pmatrix} 1 & r_{12} & \ldots & r_{1k} \\ r_{21} & 1 & \ldots & r_{2k} \\ \vdots & \vdots & & \vdots \\ \vdots & \vdots & & \vdots \\ \vdots & \vdots & & \vdots \\ r_{k1} & r_{k2} & \ldots & 1 \end{pmatrix} \quad (4)$$

The recipe analyzing part 140 calculates the correlation matrix prepared in step S32. When the Mahalanobis distance is used as the distance defined in step S19, a set of the average value, the standard deviation and the correlation matrix calculated above is defined as the reference value.

Figure 13:
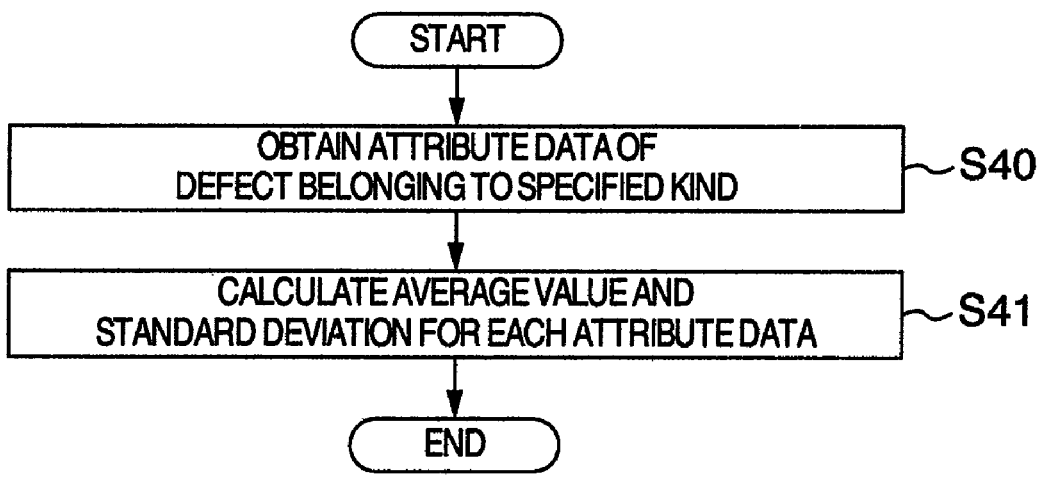
FIG. 13 is a flow chart showing processing of calculating a reference value from attribute data of defect.

FIG. 13 is a flow chart showing processing of calculating the reference value from the attribute data of the defects in the recipe analyzing part 140. An example using the Euclid distance as the distance defined in step S19 of FIG. 9 is shown in FIG. 13.

The recipe analyzing part 140 obtains the attribute data corresponding to the defect ID specified in step S17 of FIG. 9 from the defect table 161 stored in the defect information memory area 132 (step S40).

Next, the recipe analyzing part 140 calculates the average value and the standard deviation for each attribute data in each inspection recipe (step S41).

The average value $m_i$ is calculated using the expression (1) and the standard deviation $\sigma_i$ is calculated using the expression (2). When the Euclid distance is used as the distance defined in step S19 of FIG. 9, a set of the average value and the standard deviation is defined as the reference value.

Which of the Mahalanobis distance and the Euclid distance is better to be selected as the distance defined in step S19 of FIG. 9 depends on the number of items of the attribute data or the number of defects for the kind of defects (defect name) designated by the defect review apparatus. It is necessary for the Mahalanobis distance to calculate the inverse matrix of the correlation matrix calculated in the expression (4) as described later. It is known that the inverse matrix cannot be calculated correctly depending on conditions and in that case the Euclid distance may be calculated.

Figure 14:
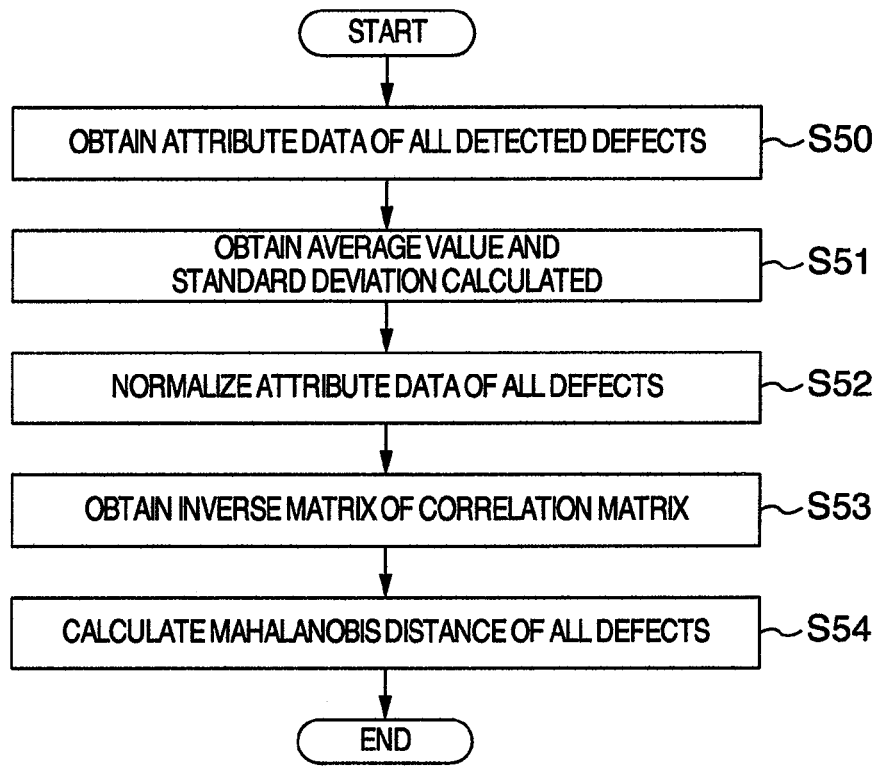
FIG. 14 is a flow chart showing processing of calculating a Mahalanobis distance of all defects.

FIG. 14 is a flow chart showing processing of calculating the Mahalanobis distance of all defects in the recipe analyzing part 140. An example using the Mahalanobis distance as the distance defined in step 19 of FIG. 9 is shown in FIG. 14.

First, the recipe analyzing part 140 obtains the attribute data of all the defects detected by the defect inspection apparatus 110 for each inspection recipe from the defect table 161 stored in the defect information memory area 132 (step S50).

The recipe analyzing part 140 obtains the average value and the standard deviation calculated in step S31 of FIG. 12 (step S51).

Next, the recipe analyzing part 140 normalizes the attribute data of all the defects obtained in step S50 on the basis of the average value and the standard deviation obtained in step S51 in accordance with the following expression (5) (step S52).

$$X_{ij} = \frac{x_{ij} - m_i}{\sigma_i} \quad (5)$$
$$(i = 1, 2, \ldots, k)$$
$$(j = 1, 2, \ldots, n)$$

The recipe analyzing part 140 obtains the inverse matrix prepared in step S33 of FIG. 12 (step S53).

Then, the recipe analyzing part 140 substitutes $X^T$ and $X$ constituted by the attribute data of all the defects normalized in step S52 as row vector and column vector for each defect, respectively, and the inverse matrix ($R^{-1}$) obtained in step S53 for those of the following expression (6) to calculate the Mahalanobis distance of each defect (step S54).

$$D^2 = \frac{1}{k} X^T R^{-1} X \quad (6)$$

The variable k of the expression (6) is the number of items of the attribute data.

The Mahalanobis distance calculated above may be arranged in the distance table 166 as shown in FIG. 17.

The distance table 166 includes a logical sum ID column 166*a* for storing logical sum IDs, a Mahalanobis distance (recipe R161) column 166*b* for storing the Mahalanobis distance of defects detected in accordance with the recipe R161, a Mahalanobis distance (recipe R162) column 166*c* for storing the Mahalanobis distance of defects detected in accordance with the recipe R162 and a Mahalanobis distance (recipe R163) column 166*d* for storing the Mahalanobis distance of defects detected in accordance with the recipe R163.

Figure 15:
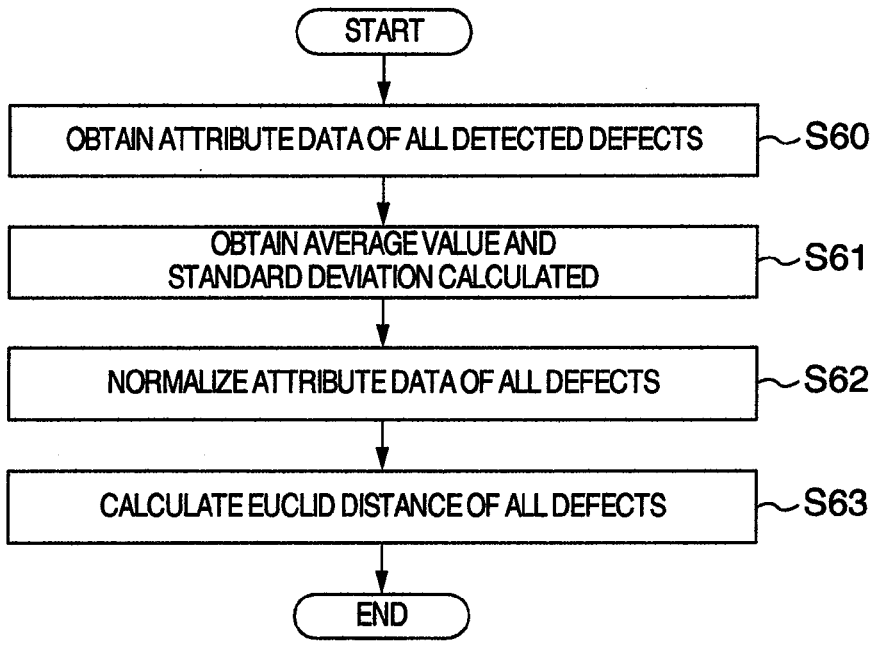
FIG. 15 is a flow chart showing processing of calculating a Euclid distance of all defects.

FIG. 15 is a flow chart showing processing of calculating the Euclid distance of all the defects in the recipe analyzing part 140. An example using the Euclid distance as the distance defined in step S19 of FIG. 9 is shown in FIG. 15.

First, the recipe analyzing part 140 obtains the attribute data of all the defects detected by the defect inspection apparatus 110 for each inspection recipe from the defect table 161 stored in the defect information memory area 132 (step S60).

The recipe analyzing part 140 obtains the average value and the standard deviation calculated in step S41 of FIG. 13 (step S61).

The recipe analyzing part 140 normalizes the attribute data of all the defects obtained in step S60 on the basis of the average value and the standard deviation obtained in step S61 in accordance with the above expression (5) (step S62).

The recipe analyzing part 140 substitutes $X^T$ and X constituted by the attribute data of all the defects normalized in step S62 as row vector and column vector for each defect, respectively, and the unit matrix (E) for those of the following expression (7) to calculate the Euclid distance of each defect (step S63).

$$D^2 = \frac{1}{k} X^T E X \tag{7}$$

The variable k of the expression (7) is the number of items of the attribute data.

The Euclid distance calculated above may be arranged in the distance table 167 as shown in FIG. 18.

The distance table 167 includes a logical sum ID column 167*a* for storing logical sum IDs, a Euclid distance (recipe R161) column 167*b* for storing the Euclid distance of the defects detected in accordance with the recipe R161, a Euclid distance (recipe R162) column 167*c* for storing the Euclid distance of the defects detected in accordance with the recipe R162 and a Euclid distance (recipe R163) column 167*d* for storing the Euclid distance of the defects detected in accordance with the recipe R163.

In the embodiment described above, a plurality of kinds may be designated in step S16 of FIG. 9 and the suitable inspection recipe may be specified for each kind.

Moreover, for example, when two kinds desired to be detected and two kinds not desired to be detected are selected, the recipe analyzing part 140 may select the inspection recipe with which the following expression (8) is made smaller on the basis of the thinking way of the signal-to-noise (SN) ratio of the Taguchi method. The number of defects similar to defects belonging to the kinds selected as the defects not desired to be detected is used for $y_1$ and $y_2$ of the expression (8) and the number of defects similar to defects belonging to the kinds selected as the defects desired to be detected is used for $y_3$ and $y_4$ of the expression (8).

Furthermore, the recipe analyzing part 140 may prepare a plurality of inspection conditions on the basis of the orthogonal array of the Design of Experiments in step S10 of FIG. 9 and calculate the signal-to-noise (SN) ratio on the basis of the expression (8), so that a plurality of inspection recipes may be combined to minimize the signal-to-noise ratio and prepare one inspection recipe.

$$\eta = -10\log\left\{\frac{1}{4} \times \left(y_1^2 + y_2^2 + \left(\frac{1}{y_3}\right)^2 + \left(\frac{1}{y_4}\right)^2\right)\right\} \tag{8}$$

As described above, according to the present invention, the plurality of inspection recipes can be prepared and the most suitable inspection recipe can be selected from among them easily and standardly. Further, when the plurality of inspection recipes can be prepared to a certain degree in number, not only the most suitable inspection recipe can be selected but also the prepared inspection recipes can be combined to prepare a new inspection recipe on the basis of the thinking way of the Taguchi method or the Design of Experiments.

Figure 19:
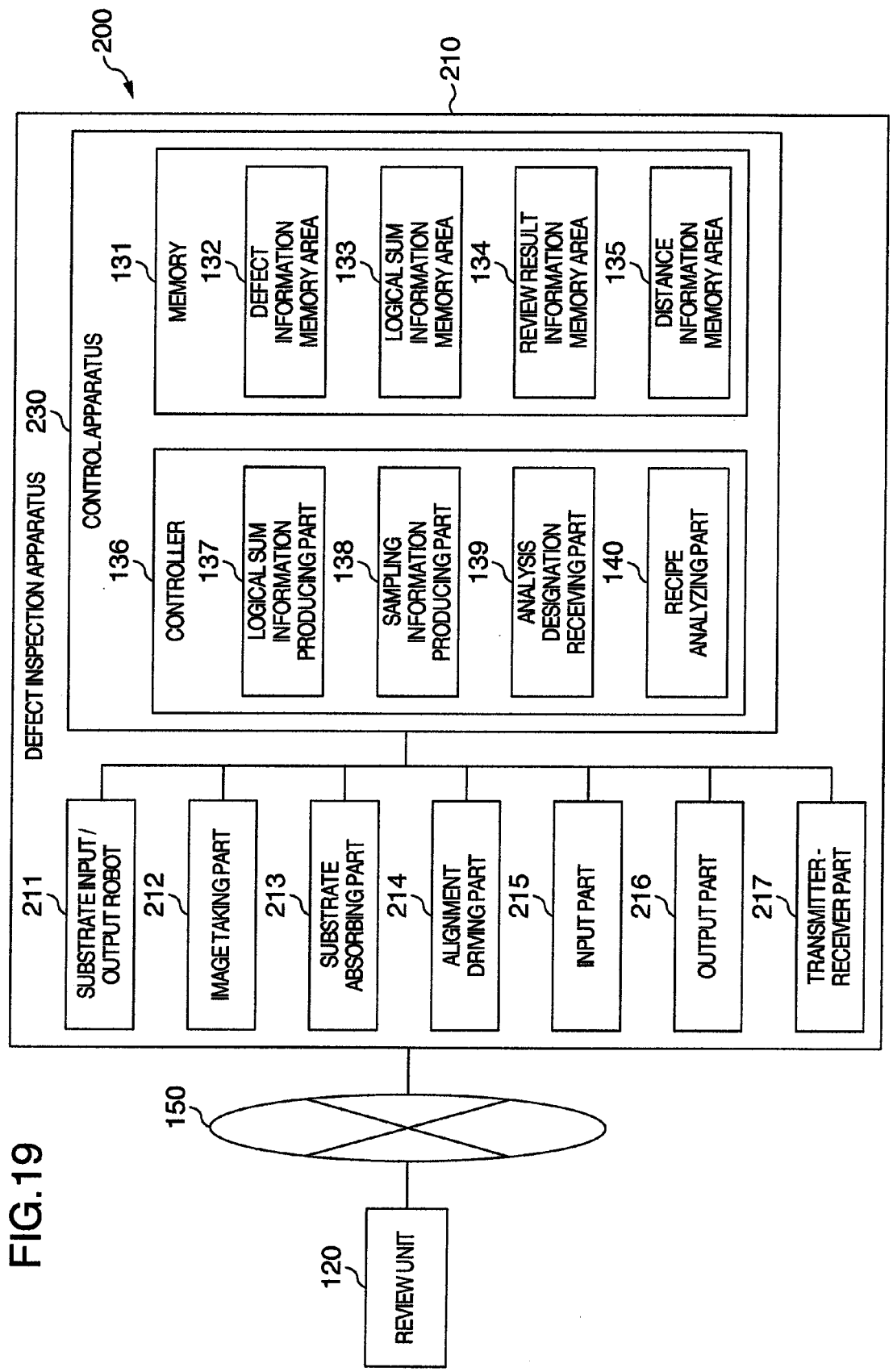
FIG. 19 is a block diagram 1 schematically illustrating an inspection system.

In the embodiment described above, the inspection system 100 includes the defect inspection apparatus 110, the defect review apparatus 120 and the analyzing apparatus 130, although the present invention is not limited thereto and, for example, as shown in FIG. 19, an inspection system 200 may include a control apparatus 230 of a defect inspection apparatus 210 in which a controller 136 and a memory 131 having the same function as the analyzing apparatus 130 may be provided so that the defect inspection apparatus 210 can analyze suitable inspection recipes.

The defect inspection apparatus 210 includes a substrate input/output robot 211, an image taking part 212, a substrate absorbing part 213, an alignment driving part 214, an input part 215, an output part 216 and a transmitter-receiver part 217.

Figure 20:
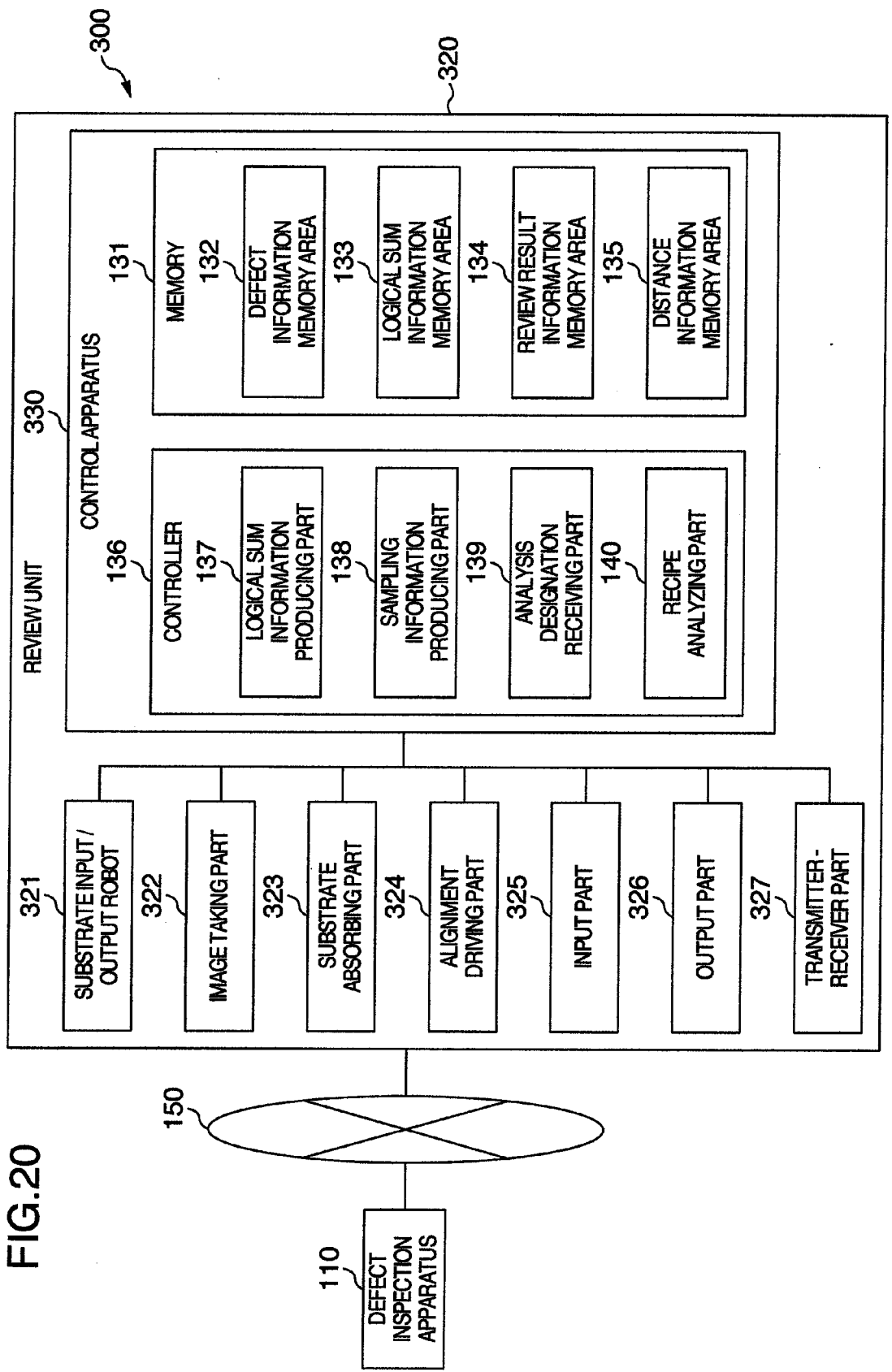
FIG. 20 is a block diagram 2 schematically illustrating an inspection system.

Moreover, as shown in FIG. 20, an inspection system 300 may include a control apparatus 330 of a defect review apparatus 320 in which a controller 136 and a memory 131 having the same function as the analyzing apparatus 130 may be provided so that the defect review apparatus 320 can analyze suitable inspection recipes.

The defect review apparatus 320 includes a substrate input/output robot 321, an image taking unit 322, a substrate absorbing part 323, an alignment driving part 324, an input part 325, an output part 326 and a transmitter-receiver part 327.

In the embodiment described above, the kind of defect (defect name) sampled in the defect review apparatus 120 is specified, although the present invention is not limited thereto and, for example, the kind of defect (defect name) may be inputted through the input part 141 of the analyzing apparatus 130 on the basis of image data taken in the defect review apparatus to be specified.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An analyzing apparatus which selects an inspection recipe with which defects to be inspected of a kind desired by a user can be detected maximally or with which defects of a kind not desired by the user can be detected minimally from among a plurality of inspection recipes prepared previously when inspection recipes for an inspection apparatus which inspects defects to be inspected are to be set, comprising:
  a defect information memory part which sets each of the plurality of inspection recipes in the inspection apparatus and receives defect information including, as a minimum, defect identification information (ID), defect coordinates and attribute data of defects which result from inspecting the same defect to be inspected by means of the inspection apparatus to store the defect information;
  a sampling information producing part which calculates a logical sum of defect IDs specifying common defect positions among the inspection recipes from defect positions obtained by the respective inspection recipes, and produces sampling information from the logical sum of the defect IDs;
  a review result information memory part which receives review result information from a defect review apparatus, which obtains an image of a position corresponding to the logical sum of the defect IDs, observed by the defect review apparatus, and which prepares kind information for each defect recognized from image information of each of the sampled defects to store the review result information;
  an analysis designation receiving part which receives kind information of defects to be analyzed by the user;
  a recipe analyzing part which specifies defect ID information of defects in the review result information corresponding to kind information designated by the user, specifies a state of a defect included in defect ID information by judging the state of the defect observed by the defect review apparatus and comparing the judged state of the defect with a feature amount included in the defect ID information, and calculates a reference value from attribute data of the defect information of the specified defect ID information, calculates distances of attribute data for all detected defects contained in the defect information from the calculated reference value, and counts a number of defects having the distance which is less than or equal to a predetermined threshold as a number of similar defects for each inspection recipe; and
  an output part which presents the number of similar defects for each inspection recipe to the user.

2. An analyzing apparatus according to claim 1, wherein the reference value contains an average value and a standard deviation of attribute data, and the distances are one of a Mahalanobis distance and a Euclid distance.

3. A non-transitory computer readable medium having instructions for causing a computer to function as an analyzing apparatus to analyze a plurality of inspection recipes set in a defect inspection apparatus, comprising:
  making the computer function as control means and memory means which stores:
  defect information associated with position of defects in a substrate and attribute data of the defects for each inspection recipe; and
  review result information to specify kind of defects selected from a logical sum of defects contained in the defect information;
  the control means performing:
  calculating the logical sum of defect identification information (ID) specifying common defect positions among the inspection recipes from the position of defects for each of the respective inspection recipes;
  producing sampling information for distinguishing a kind of defect from the logical sum of the defect IDs and transmitting the sampling information to a defect review apparatus which produces the review result information;
  storing the review result information, received from the defect review apparatus which includes an image of a position corresponding to the sampling information, to specify kind of defects selected from defects contained in the defect information;
  receiving input of kind of defects to be analyzed;
  obtaining attribute data of defects from the defect information corresponding to the inputted kind of defects contained in the review result information and calculating a reference value from the obtained attribute data for each inspection recipe;
  calculating distances from the reference value for all detected defects contained in the defect information for each inspection recipe; and
  totaling a number of defects having the distance less than or equal to a predetermined threshold for each inspection recipe.

4. A non-transitory computer readable medium according to claim 3, wherein
  the control means judges the inspection recipe, from among said plurality of inspection recipes, to be a suitable inspection recipe for detecting a kind of designated defects, that has a maximum number of defects which have the distances from the reference value that are less than or equal to a predetermined threshold for each inspection recipe.

5. A non-transitory computer readable medium according to claim 3, wherein
  the control means judges an inspection recipe, from among said plurality of inspection recipes, to be a suitable inspection recipe for a detecting kind of designated defects, that has a minimum number of defects which have the distances from the reference value that are less than or equal to a predetermined threshold for each inspection recipe.

6. A non-transitory computer readable medium according to claim 3, wherein
  the reference value contains an average value and a standard deviation of the attribute data, and
  the distance is one of a Mahalanobis distance and a Euclid distance.

7. A defect inspection apparatus which selects an inspection recipe with which defects to be inspected of a kind desired by a user can be detected maximally or with which defects of a kind not desired by the user can be detected minimally from among a plurality of inspection recipes prepared previously when inspection recipes for an inspection apparatus which inspects defects to be inspected are to be set, comprising:
  a defect information memory part which sets each of the plurality of inspection recipes in the inspection apparatus and receives defect information including, as a minimum, defect identification information (ID), defect coordinates and attribute data of defects which result from inspecting the same defect to be inspected by means of the inspection apparatus;
  a sampling information producing part which calculates a logical sum of defect IDs specifying common defect positions among the inspection recipes from defect positions obtained by the respective inspection recipes, and produces sampling information from the logical sum of the defect IDs;
  a review result information memory part which receives review result information from a defect review apparatus, which obtains an image of a position corresponding to the logical sum of the defect IDs, observed by the defect review apparatus, and which prepares kind information for each defect from image information of each of the sampled defects to store the review result information;

an analysis designation receiving part which receives kind information of defects to be analyzed by the user;

a recipe analyzing part which specifies defect ID information of defects in the review result information corresponding to kind information designated by the user, specifies a state of a defect included in defect ID information by judging the state of the defect observed by the defect review apparatus and comparing the judged state of the defect with a feature amount included in the defect ID information, and calculates a reference value from attribute data of the defect information of the specified defect ID information, calculates distances of attribute data for all detected defects contained in the defect information from the calculated reference value, and counts a number of defects having the distance shorter than or equal to a predetermined threshold as a number of similar defects for each inspection recipe; and an output part which presents the number of similar defects for each inspection recipe to the user.

8. A defect review apparatus which selects an inspection recipe with which defects to be inspected of a kind desired by a user can be detected maximally or with which defects of a kind not desired by the user can be detected minimally from among a plurality of inspection recipes prepared previously when inspection recipes for an inspection apparatus which inspects defects to be inspected are to be set, comprising:

a defect information memory part which sets each of the plurality of inspection recipes in the inspection apparatus and receives defect information including, as a minimum, defect identification information (ID), defect coordinates and attribute data of defects which result from inspecting the same defect to be inspected by means of the inspection apparatus to store the detect information;

a sampling information producing part which calculates a logical sum of defect IDs specifying common defect positions among the inspection recipes from defect positions obtained by the respective inspection recipes, and produces sampling information from the logical sum of the defect IDs;

a review result information memory part which stores review result information from kind information for each defect which is prepared from image information of each of the sampled defects, the image information being obtained from a position corresponding to the logical sum of the defect IDs observed by the defect review apparatus;

an analysis designation receiving part which receives kind information of defects to be analyzed by the user;

a recipe analyzing part which specifies defect ID information of defects in the review result information corresponding to kind information designated by the user, specifies a state of a defect included in defect ID information by judging the state of the defect observed by the defect review apparatus and comparing the judged state of the defect with a feature amount included in the defect ID information, and calculates a reference value from attribute data of the defect information of the specified defect ID information, calculates distances of attribute data for all detected defects contained in the defect information from the calculated reference value, and counts a number of defects having the distance shorter than or equal to a predetermined threshold as a number of similar defects for each inspection recipe; and an output part which presents the number of similar defects for each inspection recipe to the user.

9. An analysis system including a defect inspection apparatus, a defect review apparatus and an analyzing apparatus, wherein the defect inspection apparatus performs defect inspection of a substrate in accordance with a plurality of inspection recipes and produces defect information associated with positions of defects in the substrate and attribute data of the defects for each of the inspection recipes, and the defect review apparatus produces review result information specifying a kind of defects selected from defects contained in the defect information, the analyzing apparatus including a processing part which performs:

storing the defect information associated with position of defects in a substrate and attribute data of the defects for each inspection recipe;

calculating a logical sum of defect identification information (ID) specifying common defect positions among the inspection recipes from the position of defects for each of the respective inspection recipes;

producing sampling information for distinguishing a kind of defect from the logical sum of the defect IDs and transmitting the sampling information to the defect review apparatus which produces the review result information;

storing the review result information, received from the defect review apparatus which includes an image of a position corresponding to the sampling information, to specify kind of defects selected from defects contained in the defect information;

receiving input of kind of defects to be analyzed;

obtaining attribute data of defects from the defect information corresponding to the inputted kind of defects contained in the review result information obtained from the defect review apparatus;

specifying a state of a defect included in the defect information by judging the state of the defect and comparing the judged state of the defect with a feature amount included in the defect information;

calculating a reference value from the obtained attribute data for each inspection recipe;

calculating distance from the reference value for all defects contained in the defect information obtained from the defect inspection apparatus for each inspection recipe; and totaling a number of defects having the distance from the reference value less than or equal to a predetermined threshold for each inspection recipe.

10. An analysis system according to claim 9, wherein the control means judges an inspection recipe, from among said plurality of inspection recipes, to be a suitable inspection recipe for detecting a designated kind of defects, that has a maximum number of defects which have the distances from the reference value shorter than or equal to a predetermined threshold for each inspection recipe.

11. An analysis system according to claim 9, wherein the control means judges an inspection recipe, from among said plurality of inspection recipes, to be a suitable inspection recipe for detecting a designated kind of defects, that has a minimum number of defects which have the distances from the reference value shorter than or equal to a predetermined threshold for each inspection recipe.

12. An analysis system according to claim 9, wherein
the reference value contains an average value and a standard deviation of the attribute data and
the distance is a Mahalanobis distance or a Euclid distance.

13. An analysis method of analyzing a plurality of inspection recipes set in a defect inspection apparatus in an analyzing apparatus including a control part and a memory part, the control part executing the analysis method comprising the steps of:

storing defect information associated with position of defects in a substrate and attribute data of the defects for each inspection recipe;

calculating a logical sum of defect identification information (ID) specifying common defect positions among the inspection recipes from the position of defects for each of the respective inspection recipes;

producing sampling information for distinguishing a kind of defect from the logical sum of the defect IDs and transmitting the sampling information to a review apparatus which produces review result information;

storing the review result information, received from the review apparatus which includes an image of a position corresponding to the sampling information, to specify kind of defects selected from defects contained in the defect information;

inputting of kind of defects to be analyzed;

obtaining attribute data of defects corresponding to the inputted kind of defects contained in the review result information from the defect information;

specifying a state of a defect included in the defect information by judging the state of the defect and comparing the judged state of the defect with a feature amount included in the defect information;

calculating a reference value from the obtained attribute data for each inspection recipe;

calculating distances from the reference value for all defects contained in the defect information for each inspection recipe; and totaling a number of defects having the distance less or equal to a predetermined threshold for each inspection recipe.

* * * * *